(12) United States Patent
Ma et al.

(10) Patent No.: US 6,829,608 B2
(45) Date of Patent: Dec. 7, 2004

(54) SYSTEMS AND METHODS FOR DISCOVERING MUTUAL DEPENDENCE PATTERNS

(75) Inventors: Sheng Ma, Briarcliff Manor, NY (US); Joseph L. Hellerstein, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 09/918,253

(22) Filed: Jul. 30, 2001

(65) Prior Publication Data

US 2003/0023591 A1 Jan. 30, 2003

(51) Int. Cl.⁷ ............................................. G06F 17/30
(52) U.S. Cl. ................................ 707/6; 707/10; 707/7; 707/100; 707/101; 707/1
(58) Field of Search ........................... 707/101, 10, 6, 707/1, 7, 103, 2, 3

(56) References Cited

U.S. PATENT DOCUMENTS

| | | | | |
|---|---|---|---|---|
| 6,182,070 B1 | * | 1/2001 | Megiddo et al. ............... | 707/6 |
| 6,189,005 B1 | * | 2/2001 | Chakrabarti et al. .......... | 707/6 |
| 6,230,153 B1 | * | 5/2001 | Howard et al. ................ | 707/2 |
| 6,278,997 B1 | * | 8/2001 | Agrawal et al. ............... | 707/6 |
| 6,301,575 B1 | * | 10/2001 | Chadha et al. ................ | 707/2 |
| 6,311,173 B1 | * | 10/2001 | Levin et al. ................... | 706/21 |

OTHER PUBLICATIONS

Kitts et al., "Cross–sell:A fast promotion tunable customer item recommendations method based on conditionally independent probabilities", CAN, pp. 437–446.*

Psaila et al., "Hierarchy based mining of association rules in data warehouses" ACN pp. 307–312.*

Cromp et al., "Data mining of multidimensional remotely sensed images" ACN, pp. 471–480.*

Zadrozny et al., "Learning and making decision when costs and probabilities are both unknown" ACN pp. 204–213.*

U.S. Appl. No. 09/739,432, Hellerstein et al., "Systems and Methods for Discovering Partially Periodic Event Patterns", filed Dec. 18, 2000.

R. Agrawal et al., "Mining Association Rules Between Sets of Items in Large Databases," Proc. of VLDB, pp. 207–216, 10 pages, 1993.

R. Srikant et al., "Mining Sequential Patterns: Generalizations and Performance Improvements," Proc. of the Fifth Int'l Conference on Extending Database Technology (EDBT), Avignon, France, 15 pages, 1996.

H. Mannila et al., "Discovery of Frequent Episodes in Event Sequences," Data Mining and Knowledge Discovery, 1(3), pp. 1–45, 1997.

* cited by examiner

*Primary Examiner*—Jean M. Corrielus
(74) *Attorney, Agent, or Firm*—Rafael Perez-Pineiro; Ryan, Mason & Lewis, LLP (57) ABSTRACT

A new form of pattern is provided, referred to as a mutual dependence pattern or m-pattern. The m-pattern captures mutual dependence among a set of items. Intuitively, the m-pattern represents a set of items that often occur together. In our experience, such m-patterns often provide great values for certain tasks, such as event correlation in event management. Further, an efficient algorithm is provided for discovering all m-patterns in data for a given minimum mutual dependence threshold. Specifically, a linear algorithm is provided for testing whether a pattern is an m-pattern. Further, a pruning algorithm is provided that prunes the search space effectively. Still further, a level-wise algorithm for mining m-patterns is provided.

36 Claims, 8 Drawing Sheets

| PATTERNS | COUNT |
|---|---|
| a | 3 |
| b | 2 |
| c | 1 |
| d | 3 |
| e | 3 |
| f | 4 |
| g | 7 |

— 104

| PATTERNS | COUNT |
|---|---|
| ab | 2 |
| ad | 3 |
| ae | 1 |
| af | 1 |
| ag | 3 |
| ... | ... |

— 106

EXAMPLE FOR DEPENDENCY (50% AS THRESHOLD)
{ag} 
P{a | g} = COUNT{ag}/COUNT{g} = 3/7
P{g | a} = COUNT{ag}/COUNT{a} = 3/3
a→g, BUT NOT g→a
{ab}
P{a | b} = 2/2
P{b | a} = 2/3
a→b, AND b→a, (ab) IS NOT FREQUENT

- INPUT: A SET OF CANDIDATES $C_k$, COUNT INFORMATION AT ALL PREVIOUS LEVELS, AND A THRESHOLD $minp$
- OUTPUT: A SET OF PRUNED CANDIDATES $C'_k$
- ALGORITHM
  - For each pattern $pat$ in $C_k$
    - For each item $a$ in $pat$
      - Compute: $prob = Count(pat-a)/Count(a)$;
      - if $prob < minp$
        - $C_k = C_k - pat$
        - break the for-loop
  - Return $C_k$

FIG. 8B

- INPUT: PATTERN $pat$, ALL COUNT INFORMATION, AND A THRESHOLD $minp$
- OUTPUT: TRUE IF $pat$ IS A QUALIFIED M-PATTERN; OTHERWISE FALSE.
- ALGORITHM
  - For each $a$ in $pat$
    - $prob = Count(pat)/Count(a)$
    - if $prob < minp$
      - return false
  - Return true
- This algorithm is $O(k)$

FIG. 9

SYSTEMS AND METHODS FOR DISCOVERING MUTUAL DEPENDENCE PATTERNS

FIELD OF THE INVENTION

The present invention relates generally to data processing techniques and, more particularly, to methods and apparatus for discovering mutual dependence patterns in data.

BACKGROUND OF THE INVENTION

Data mining seeks to discover interesting and previously unknown patterns or information from a large amount of historical data often stored in a database. Specifically, one key aspect of data mining is to search for significant patterns embedded in the data. Here, a pattern refers to a set of items denoted as pat=$\{i_1, i_2, i_3, \ldots, i_k\}$, where $i_j$ is the j-th item.

Existing approaches have focused on discovering one special form of pattern called a frequent association pattern, referred to as "fa-pattern." Fa-patterns are patterns whose support (or occurrences) in data is above a predefined minimum support threshold called minsup. Several applications of the fa-pattern have been studied. The most popular one is the "market basket" analysis, in which an algorithm is applied to mine transaction data consisting of a set of transactions. A transaction is a set of items purchased by a customer. For example, a customer may buy milk, bread, and beer, together. The corresponding transaction is thus trans=$\{a, b, c\}$, where a, b, and c represent milk, bread, and beer, respectively. The association discovery problem can be formally stated as: find all patterns (i.e., a set of items) whose number of co-occurrences in D is above a predefined threshold called minimum support (minsup), where D is a set of N transactions $\{trans_1, \ldots, trans_N\}$. We note that an item here is a generic name. It is mapped to an original data object by a certain mapping scheme. For example, an original data object of transaction data may have multiple attributes such as the type of goods (e.g., milk, beer), its brand, quantity, and purchase time. One commonly-used mapping is to map the values of the type into items. For example, milk is represented by "a."

Fa-patterns can be generalized to handle temporal events. Here, the temporal event data is an ordered sequence with length N: $\{(i_1, t_1), (i_2, t_2), \ldots, (i_N, t_N)\}$, where time $t_i$ $t_j$ if $i \leq j$. The temporal association discovery problem can be stated as: find all patterns whose number of co-occurrences within a time window w is above minsup. Here, the time window is introduced to essentially segment an ordered time sequence into transactions.

Finding all fa-patterns is not a trivial task because the pattern space is exponentially large, to be precise, $n^k$, where n is the number of distinct items, and k is the maximum length of a pattern. Brute-force iteration is computationally intractable. Recently, Agrawal et al. (as described in R. Agrawal et al., "Mining Association Rules Between Sets of Items in Large Databases," Proc. of VLDB, pp. 207–216, 1993, the disclosure of which is incorporated by reference herein) developed an algorithm called "Apriori" to discover all fa-patterns. This algorithm searches the pattern space in a level-wise manner by the following four step process:

1. Initialization. The data is scanned to find all fa-pattern with only one item. k is set to be 2.

2. Construct candidate patterns with length k. This is typically done by a joint operation of fa-patterns found in the previous level, followed by a pruning operation.

3. Count the candidate patterns. Data is scanned in order to count the occurrences of candidate patterns.

4. Find fa-patterns at the k-th level. Fa-patterns are those candidate patterns whose count (or occurrences) are above minsup.

This procedure proceeds level by level until no more patterns can be found. The key idea of this algorithm is to search the pattern-space in a level-wise manner. The fa-patterns found at the current level are used to eliminate the search space for the next level. In this way, the number of patterns to be searched are minimized, and the number of data scans is the maximum length of fa-patterns. Since the introduction of the "Apriori" algorithm, work has been done to improve the algorithm so as to reduce the number of data scans, reduce the memory requirement, and improve efficiency through different search strategies.

Needless to say, association discovery has been widely employed for applications such as market basket analysis. The technique's success is partly because frequent patterns capture patterns that are popular, and thus provide valuable information for directly marketing to relevant portions of a large population, rather than to the entire population. This maximizes the advertisement return.

However, frequent patterns may not be of equal interest in other tasks such as, for example, problem detection in computer system management, intrusion detection in computer systems, and credit card fault detection. There are several fundamental reasons for this situation:

1. Frequent patterns are not always of interest. In the aforementioned applications, the normal operations or behaviors are usually massive in quantity. It is not a surprise that a large number of frequent patterns can be found in these applications. However, most of them relate to normal behaviors, and thus are usually not very informative. This is simply because normal operations are usually known by domain expertise, and are actionable. Furthermore, even if a frequent pattern relates to a problem, it is usually known already through other means, since unknown problematic situations are, in general, infrequent in these applications.

2. Infrequent patterns may be of interest. For example, a system management application may be required to discover problematic situations that are expected to be rare. Applying existing algorithms for discovering association patterns will not result in finding infrequent patterns, unless the minimum support threshold is set to be extremely low. This, however, results in far many uninteresting patterns.

3. Co-occurrence does not necessarily reflect the dependence of items in a pattern. By definition, the occurrences of an fa-pattern is at least minsup. However, this does not guarantee any real dependence among items in an fa-pattern. In an extreme case, a set of independent items may be qualified as an fa-pattern because the frequent association does not take into consideration the distribution of each item. This is further explained by the following example. Assume that items a and b occur independently and randomly in 50% of all transactions. In this case, the expected frequency of the co-occurrence of $\{a,b\}$ is 25%, which is still pretty significant, and may well be above minsup.

SUMMARY OF THE INVENTION

The present invention provides techniques for mining or discovering infrequent patterns that can not be found effectively and efficiently using existing pattern mining techniques and which may be valuable for a variety of applications. Specifically, the invention defines a mutual dependence pattern or "m-pattern." An m-pattern captures a set of items that often occur together regardless of the number of occurrences. Thus, infrequent, but interesting, patterns may be found.

In one aspect of the invention, a technique for mining one or more patterns in an input data set of items comprises identifying one or more sets of items in the input data set as one or more patterns based on respective comparisons of conditional probability values associated with each of the one or more sets of items to a predetermined threshold value. The one or more identified patterns are output based on results of the comparisons. The input data set may comprise such data as event data and/or transaction data.

In one embodiment, the identifying operation may comprise identifying a set of items in the input data set, which includes at least two subsets of at least one item, as a pattern when the set of items has a conditional probability value computed therefor that is not less than a predetermined threshold value, wherein the conditional probability value is indicative of a probability that both of the at least two subsets of at least one item will occur given that one of the at least two subsets of at least one item has occurred.

In another embodiment, the identifying operation may comprise identifying a set of items in the input data set as a pattern when the set of items has a conditional probability value computed for the set of items minus a particular item of the set, given the particular item of the set, that is not less than a predetermined threshold value.

In another aspect of the invention, a technique for mining one or more patterns in an input data set of items comprises: obtaining an input data set of items; searching the input data set of items to identify one or more sets of items in the input data set as one or more patterns based on respective comparisons of conditional probability values associated with each of the one or more sets of items to a predetermined threshold value; and outputting the one or more identified patterns based on results of the comparisons.

Prior to the searching operation, the input data set may be normalized so that the data is not application-dependent. The outputting operation may convert the one or more identified patterns into a human readable format. The searching operation may comprise performing a level-wise scan based on a set length to determine candidate sets of items in the input data set that have conditional probability values respectively computed therefor that are not less than the predetermined threshold value. The search step may also comprise pruning candidate sets based on an upper bound property. In one embodiment, the upper bound property specifies that only candidate sets are considered where the conditional probability of a set of items minus a particular subset of items given the particular subset of items is not greater than the number of occurrences of the set of items minus the particular subset of items divided by the number of occurrences of the subset of items.

Discovering such m-patterns may benefit many applications. For example, such an m-pattern in an event management application indicates that a set of events, if they occur, occur together with high probability. This implies strong correlation among events. Thus, event correlation rules can be developed for the purpose of either event compression or on-line monitoring. In another example, an m-pattern in a customer transaction analysis indicates that a set of items, say milk and bread, are likely to be bought together. By knowing such information, a store manager may better arrange items in the store (e.g., putting milk and bread in nearby locations). The store manager may also develop a better promotion strategies (e.g., lowering the price of milk, but increasing the price of bread). Of course, in accordance with the principles of the invention taught herein, one of ordinary skill in the art will realize many other applications of m-patterns.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENT

The present invention provides techniques for mining infrequent patterns that can not be found effectively and efficiently using existing pattern mining techniques. Mining infrequent, but interesting, patterns is intrinsically difficult for two reasons. First, there are many combinations of items happening just by chance. Second, it is difficult to distinguish a true pattern from random or noisy patterns. The present invention overcomes these and other difficulties by defining a new pattern called a "mutually dependent pattern" or an "m-pattern," as will be further defined below. More specifically, the invention provides techniques for discovering m-patterns. To do so, two major issues are addressed: (1) how to check that a pattern is a qualified m-pattern; and (2) how to discover all m-patterns.

The present invention will be described below in the context of an exemplary application of mining event data in a system management application. However, it is to be understood that the invention is not limited to use with any particular application domain but is rather more generally applicable for use in accordance with any application domain (e.g., systems management, process control, manufacturing, to name a few examples) in which it is desirable to provide a determination of infrequent patterns in event data, generated in accordance with the application domain.

Intuitively, an m-pattern captures a set of items that often occur together. In other words, if a part of an m-pattern occurs, it is likely, to a high probability, that the other part of the m-pattern will be seen. This can be formally defined as follow:

A set of items $E=\{i_1, i_2, \ldots, i_k\}$ is said to be an m-pattern with a minimum mutual dependence threshold minp, if and, preferably, only if the conditional probability $p(E1 \backslash E2)$ is above a minimum mutual dependence threshold minp, where $0 \leq minp \leq 1$, for any non-empty two subsets E1 and E2 of E.

The conditional probability can be estimated by $p(E1 \backslash E2)=count(E1+E2)/count(E2)$, where $p(x)$ is the occurrence probability of x, and count(x) represents the number of occurrences of x in the data. One major difference between an m-pattern and an fa-pattern is that an m-pattern is qualified by the minimum mutual dependence threshold minp rather than the minimum count threshold minsup. As a result, an m-pattern may not be an fa-pattern. That is, we can have an m-pattern only occur two or three times. Likewise, an fa-pattern may not be an m-pattern. For example, let $E=\{a,b\}$, where it is understood that the notation $\{a,b\}$ is equivalent to (a+b), meaning the set of a and b. It may be the case that the occurrence of "a" and "b" is above minsup. However, $p(a \backslash b)$, which can be estimated by $count\{a,b\}/count(b)$, may well be below minp because count (b) may be far more than $count\{a,b\}$.

In accordance with the present invention, an algorithm is provided for discovering all m-patterns whose mutual dependence test is above minp. Two issues are addressed: (1) how to test whether a pattern is an m-pattern; and (2) how to discover all m-patterns efficiently.

The first issue is straight forward. However, a naive implementation based on the m-pattern definition may lead to very intensive computations. To understand this, we note that the definition of m-patterns requires to compute the conditional probability of any two subsets of a pattern, and test it against minp. Clearly, this requires to compute $O(2^k)$ conditional probabilities, and comparisons, where k is the length of a pattern. Here, we develop an algorithm that scales linearly. A main idea is to identify a sufficient set of subsets of a pattern, and thus only check this set of subsets rather than all subsets. Our results are summarized in the following equivalent definition of an m-pattern:

For a given pattern, $pat=\{i_1, i_2, \ldots, i_k\}$, pat is an m-pattern, if and, preferably, only if $p(pat-a \backslash a)>minp$ for any item a in pat.

Now, we sketch the proof. In that, we need to prove both the sufficient and necessary conditions. We start with the necessary condition. In that, we need to prove that if pat is an m-pattern, then $p(pat-a \backslash a)>minp$. Let E1=pat-a and E2={a}. We note that E1 and E2 are two subsets of pat. Therefore, the conclusions are followed by the definition of m-pattern. Now, we prove the sufficient condition. Let E1 and E2 represent any two subsets of pat. Let a be an item belonging to E2. Since {a} is a subset of E2, we have $p(a) \geq p(E2)$. Similarly, since E1+E2 ("+" represents the set union operation) is a subset of pat, $p(E1+E2) \geq p(pat)$. Further, $p(E1/E2)=p(E1+E2)/p(E2) \geq p(pat)/p(a)>minp$. Since E1 and E2 are any two subsets of pat, the sufficient property follows by the definition of m-patterns.

The equivalent definition gives us an efficient way to test whether pat is an m-pattern. In that, we only need to compute k conditional probabilities and comparisons, where k is the pattern length.

Now, we discuss the second issue. That is, how to discover all m-patterns. Clearly, all possible patterns are $n^k$, where n is the number of distinct items, and k is the maximum length. Obviously, we can not afford computationally to enumerate all possible patterns and check its mutual dependence condition. To handle this problem, we note the downward closeness property of m-patterns.

Downward closure property: let pat be a pattern and pat' be a sub-pattern of pat. Then, if pat is an m-pattern, then pat' must be an m-pattern.

Proof: Let E1 and E2 be any two non-empty subsets of pat'. Clearly, they are also subsets of pat because pat' is a subset of pat. Since pat is an m-pattern, we obtain $p(E1 \backslash E2)>minp$ by the m-pattern definition. Therefore, pat' is an m-pattern.

The above property also implies that if pat' is not an m-pattern, then pat is not an m-pattern. Therefore, a level-wise algorithm can be developed. The algorithm has five steps. First, all m-patterns are found with length two, and then k is set to three. This requires one data scan for counting all patterns with length two, and then testing the mutual dependence. Second, candidate m-patterns are generated with length k based on qualified m-patterns with length k−1. Third, data is scanned for counting all candidate patterns with length k. Fourth, all m-patterns with length k are found. Finally, if there is any valid m-pattern, k is increased by one, and step 2 is returned to for searching the next level patterns.

To make this algorithm even faster, we further prove an upper bound of m-patterns. This upper bound can be used for pruning candidates further.

Upper bound property: let E be a subset of pat. Then, $p(pat-E \backslash E) \leq p(pat-E)/p(E)$.

Proof: $p(pat-E \backslash E)=p(pat)/p(E)$. Since $p(pat) \leq p(pat-E)$, our conclusion follows.

Since we maintain the counts for all k−1 m-patterns, we can prune candidates in step 1 and step 2 based on the upper bound before scanning the data. This drastically reduces the number of candidates for the counting task in step 3.

The present invention provides a system for implementing the above-described algorithms. That is, as will be explained below, the present invention provides a system to mine m-patterns from a large amount of data including both transaction-like data and temporal event data. It is to be understood that the m-pattern discovery algorithms of the invention have many applications, e.g., system management application, in which the discovered m-patterns can serve as the basis for forming event correlation rules, problem determination and diagnosis, and abnormality detection. However, the invention is not limited to any particular application.

We organize the remainder of the detailed description as follows. First, we provide notations and examples to illustrate the concepts of m-patterns. Second, we provide an illustrative system for mining m-patterns. Third, we describe our algorithms in details.

We start with notations. A pattern is a set of items. Small-cap symbols are used to represent items. For example, a pattern consisting of items a, b, and c can be represented by pat={a, b, c}. Further, a temporal pattern is a pattern with time window w.

Figure 1:
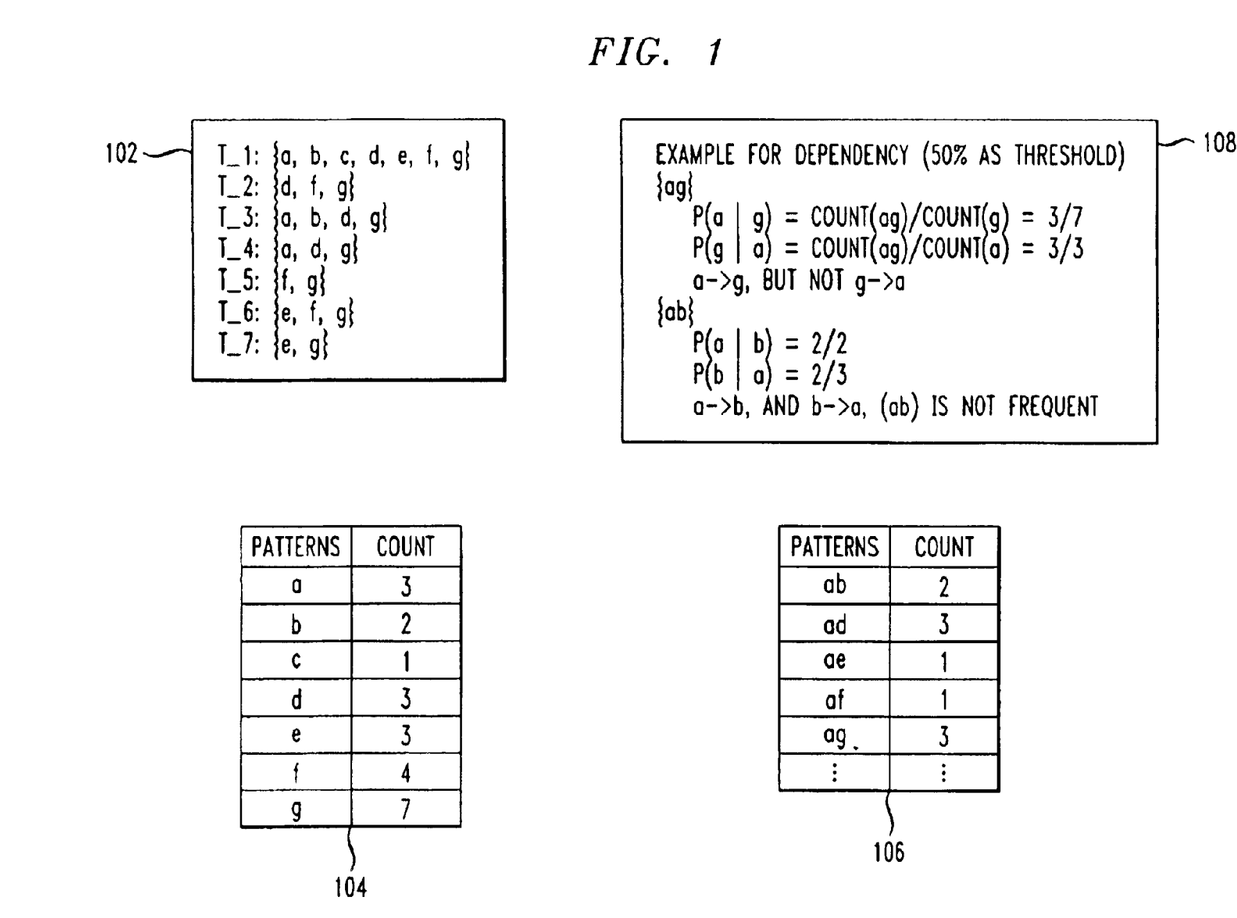
FIG. 1 is a diagram illustrating an example of the concept of m-patterns according to the invention in accordance with transaction data.

Referring initially to FIG. 1, a diagram illustrates an example of the concept of m-patterns according to the invention in accordance with transaction data. Seven transactions are listed in the left upper part of the figure, denoted as 102. $T_i$, where i=1, 2, ..., 7, represents the i-th transaction. Symbols a to g represent items. Further, we list in tables 104 and 106, the patterns with one item and two items, respectively. We also provide their occurrence counts. For example, the count of pattern {a} is 3. The count of {a,b} is 2. Frequent association patterns (fa-patterns) are the patterns whose number of occurrences is above a minsup threshold. Say, minsup is three. Then, {a, d} and {a,g} are fa-patterns. The m-patterns are defined by mutual dependence, which requires that all two subsets are dependent above a minp threshold. For a pattern with two items, say pat={a,b}, two conditional probabilities are computed: p(a\b) and p(b\a), which can be estimated from counts. That is, p(E1\E2)=count(E1+E2)/count(E2), where E1 and E2 are two sets of items, and the plus sign represents the union operation of two sets. Referring to the example, denoted as 108 in FIG. 1, if minp is 50%, then we can see that {a,b} is an m-pattern, but {a,g} is not an m-pattern as p(a\g)= 3/7<50%. This illustrates that an m-pattern may not be an fa-pattern (e.g., {a,b}), likewise, an fa-pattern may not be an m-pattern (e.g., {a,g}).

Figure 2:
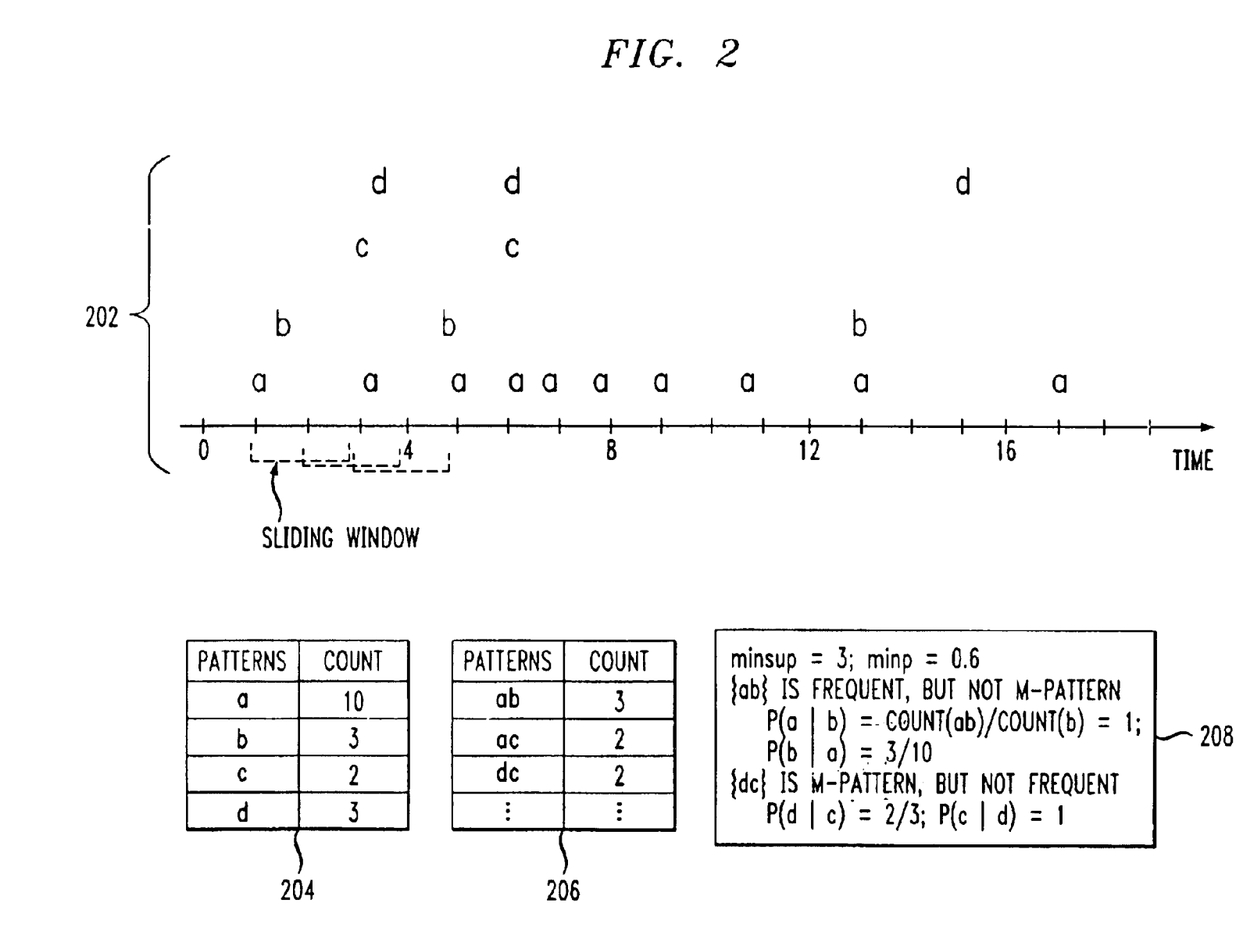
FIG. 2 is a diagram illustrating an example of the concept of m-patterns according to the invention in accordance with event sequence data.

The fa-pattern and m-pattern can be generalized to handle event sequence data. FIG. 2 illustrates this concept. An illustrative event sequence, denoted as 202, is drawn on a time axis. In the event sequence, an item is drawn above its occurrence time. In order to associate temporal items, a sliding time window is introduced. In this example, the time window is 2. An occurrence (or an instance) of a pattern requires the occurrences of all its items within time window w. In this way, the number of occurrences of a pattern may be counted. The conditional probability can then be computed in the same way as in 108 in FIG. 1. As illustrated in FIG. 2, it can be the case that an m-pattern is not an fa-pattern (e.g., {a,b}, since 3/10 is less than a minp of 0.6), and an fa-pattern is not an m-pattern (e.g., {d,c}).

Now, we discuss an illustrative system for mining m-patterns in accordance with the principles of the invention described above. We start with a generic mining system.

Figure 3:
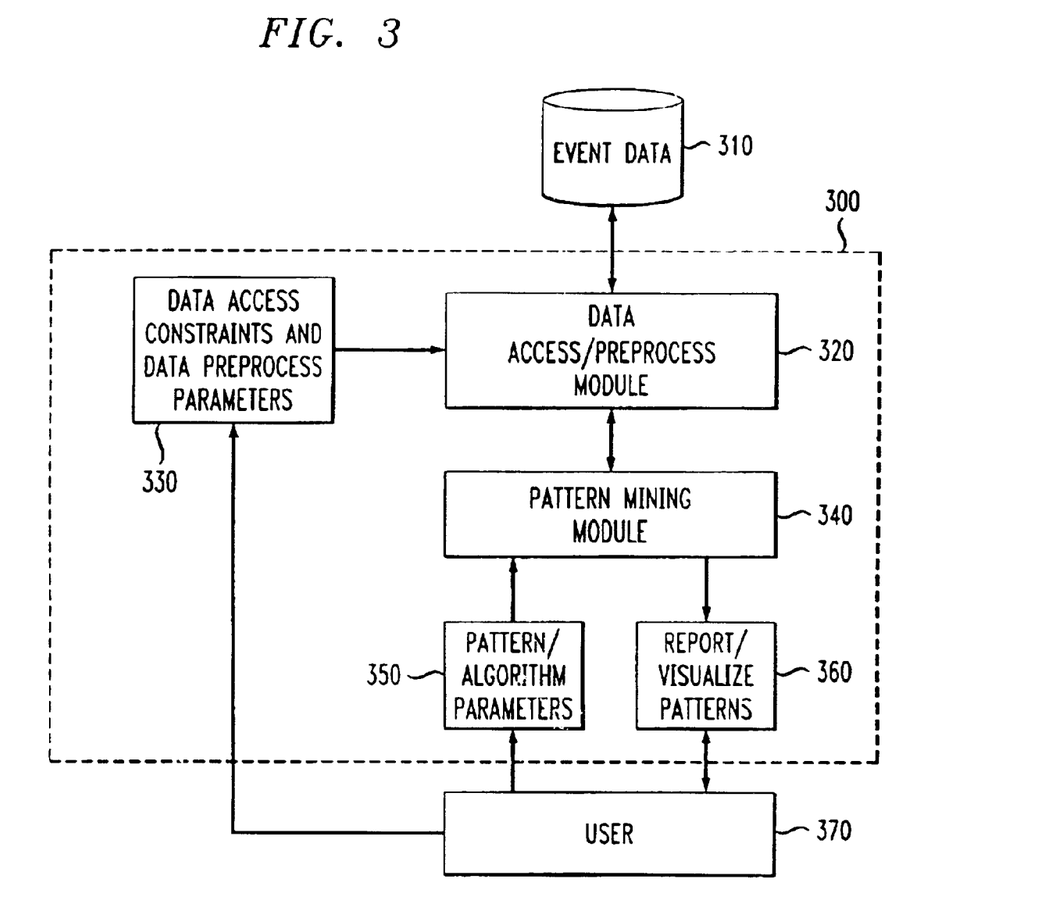
FIG. 3 is a block diagram illustrating a system for mining m-patterns according to an embodiment of the present invention.

Referring now to FIG. 3, a block diagram illustrates a system 300 for mining or discovering mutually dependent patterns or m-patterns, as well as other patterns, according to an embodiment of the present invention. As shown, the system includes a data access/preprocess module 320 and a pattern mining module 340, as well as user interface modules 330, 350 and 360. Event data 310 is input to the system and may be stored in either flat files or a database. It is to be understood that the data may alternatively be transaction data. The data access/preprocess module 320 provides basic functions to access and preprocess the event data so as to prepare and load the event data for mining. Data access functions may include SQL-like (Standard Query Language-like) operations based on user-provided constraints input and stored via interface module 330, as well as typical file access functions. Through interface module 330, a user 370 is able to define attributes (e.g., columns) and events (e.g., rows) that are of interest. Such data access constraints and data preprocess parameters are used to perform access/preprocessing functions on the event data in module 320. Preprocessing functions may include data format transformation (e.g., converting raw textual fields into structured fields), attribute mapping functions (e.g., mapping string name into ID), filling in missing data fields, filtering out unwanted recorded based on constraints (from module 330), etc. It should be noted that it is not necessary to load event data into the main memory of the computer system executing the data access/preprocessing functions. Rather, the data access module 320 preferably provides functions supporting data scan. Such functions may include: (i) get the first (qualified) record; and (ii) get the next record. It may also cache events for a specified time window. These basic data access functions are used by the mining algorithms for scanning the data.

Once proper event data has been defined in accordance with module 320, the pattern mining module 340 processes event data and produces patterns. An m-pattern is one type of pattern that may be of interest to an end-user. Other frequently referred patterns that may be mined by module 340 include, for example, temporal associations (as described in R. Srikant et al., "Mining sequential patterns: Generalizations and performance improvements," Proc. of the Fifth Int'l Conference on Extending Database Technology (EDBT), Avignon, France, 1996, the disclosure of which is incorporated by reference herein) and frequent episodes (as described in H. Mannila et al., "Discovery of frequent episodes in event sequences," Data Mining and Knowledge Discovery, 1(3), 1997, the disclosure of which is incorporated by reference herein). Of course, other patterns may be discovered by the system 300.

It is to be appreciated that the user 370 controls the mining process in three ways. First, the user can control the set of event data that will be mined through defining data access/preprocessing constraints (entered at interface module 330). Second, the user may define the type of patterns (e.g., m-patterns) to be mined, and determine a mining algorithm to be used and its parameters, including significance scores. Such pattern/algorithm parameters are entered by the user at the interface module 350. Third, the user may determine what kind of patterns are of interest based on specifying interest scores, and interactively view/select patterns that are of interest. Interface module 360 provides an interactive mechanism for a user to exam m-patterns and/or other patterns found. Reporting and visualization of the patterns found can be done in many ways. For example, a view list can be used to list m-patterns found, while a tree view can be used to provide the hierarchical presentation. Visualization techniques can also be used to help a user to understand m-patterns. It is to be appreciated that the present invention is not intended to be limited to any particular reporting and visualization techniques, but rather focuses on pattern mining techniques. Thus, any suitable reporting and visualization techniques may be employed in accordance with module 360.

Figure 4:
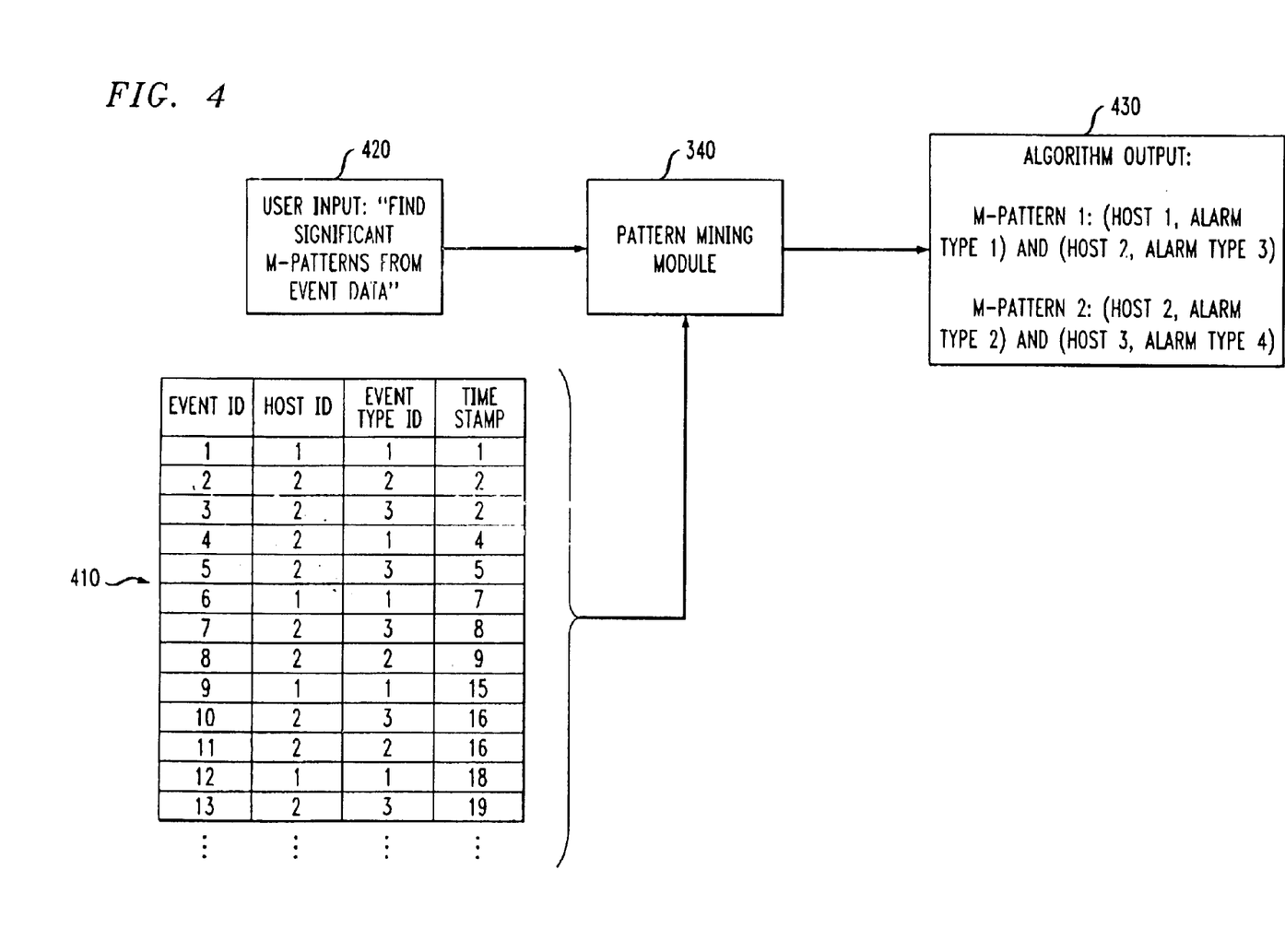
FIG. 4 is a diagram illustrating an example of inputs and outputs associated with the pattern mining module 340 in FIG. 3.

Referring now to FIG. 4, a diagram illustrates an example of inputs and outputs associated with the pattern mining module 340 in FIG. 3. One input is an event table 410. As explained above, the event table may be generated in accordance with the data access/preprocessing module 320. As shown in FIG. 4, each row of the table is an event. Each column of the table is an attribute of an event. This example has four columns. They are: (i) event ID, which is the unique identifier for an event; (ii) host ID, which identifies the originator of an event; (iii) event type ID, which indicates a problem type; and (iv) time stamp, which indicates the occurrence time of an event. We note that the number of columns and their meanings depend on a specific application and, therefore, the invention is not intended to be limited to any specific format. The other input 420 shown in FIG. 4 is the user input command: "Find significant m-patterns from the event data." Not expressly shown, but intended to be implicitly represented in the user command, are the specific user inputs described above in the context of interface modules 330 (data access constraints and data preprocess parameters), 350 (pattern/algorithm parameters), and 360 (report/visualization selection).

The inputs 410 and 420 are processed by the pattern mining module 340 and yield output 430 in the form of one or more discovered m-patterns. Two m-patterns can be found in this example. The first m-pattern is read as "m-pattern 1: (host 1, alarm type 1) and (host 2, alarm type 3)" and the second pattern is read "m-pattern 2: (host 2, alarm type 2)." As shown, an m-pattern is described by the set of events in the m-pattern. For example, m-pattern 1 has two events: (host 1, alarm type 1) read as event from host 1 with alarm type 1, and (host 2, alarm type 3) read as event from host 2 with alarm type 3. The fact that these events are determined to be an m-pattern means that the two events are considered to be mutually dependent. M-pattern 2 may be interpreted in the same manner.

In addition, the pattern mining module may output other information associated with the m-pattern such as, for example, a score associated with the m-pattern. The score may relate to an occurrence count associated with the events or some value indicating the level of mutual dependence between the events (e.g., the associated conditional probability value or a value representing the difference between the associated conditional probability value and the minimum mutual dependence threshold, minp).

Figure 5:
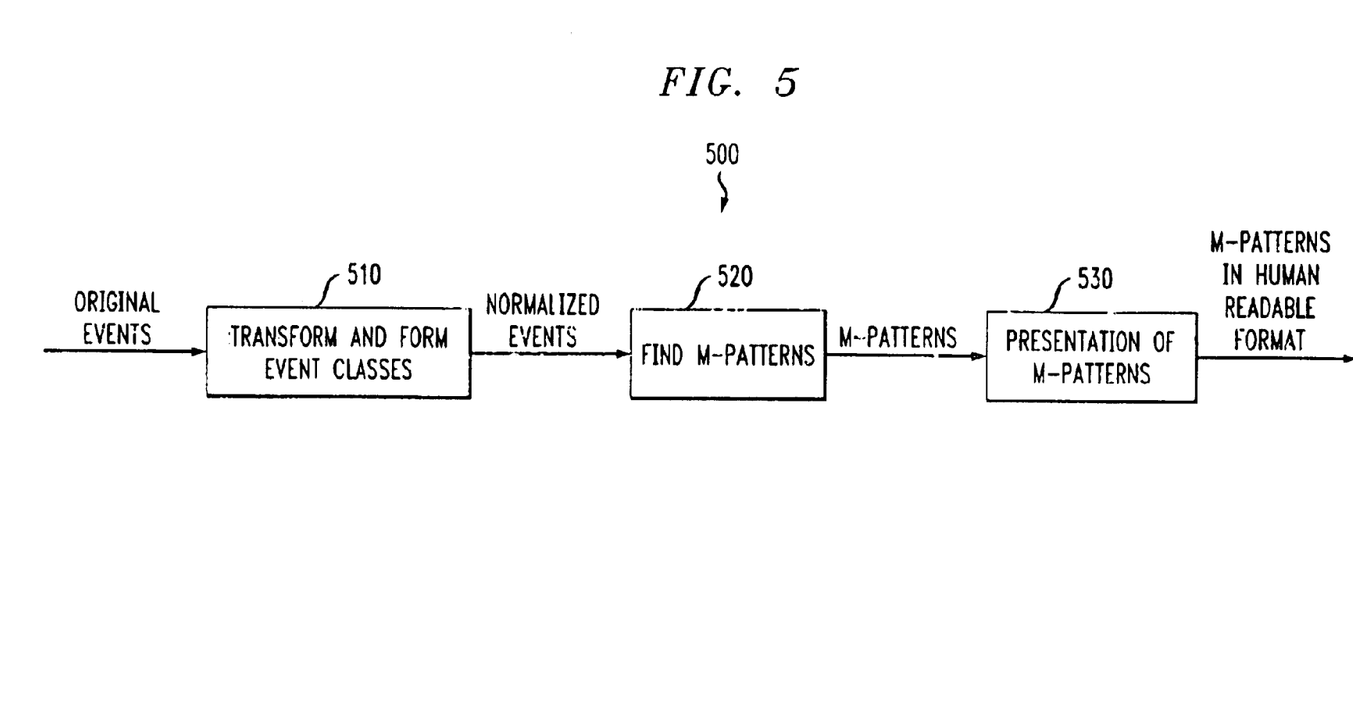
FIG. 5 is a flow diagram illustrating a pattern mining methodology according to an embodiment of the present invention.

FIG. 5 is a flow diagram illustrating a pattern mining methodology according to an embodiment of the present invention. Specifically, FIG. 5 shows a methodology 500 that may be employed by the pattern mining module 340 (FIG. 3). In accordance with this embodiment, discovering m-patterns is accomplished in three steps: (i) transforming an event table (step 510); (ii) finding m-patterns (step 520); and (iii) transforming the m-patterns found to a human readable format or presentation (step 530). The first step (step 510) transforms an application-dependent table into a normalized, application-independent table. This will be further described in the context of FIG. 6. The second step (step 520) of finding m-patterns has been described above and will be further illustrated in the context of FIGS. 7, 8A and 8B. The last step (step 530) is to reformat the discovered patterns into human readable format. This may involve reverse mapping of ID to names. It may also include certain user interfaces for visualizing and summarizing patterns.

Figure 6:
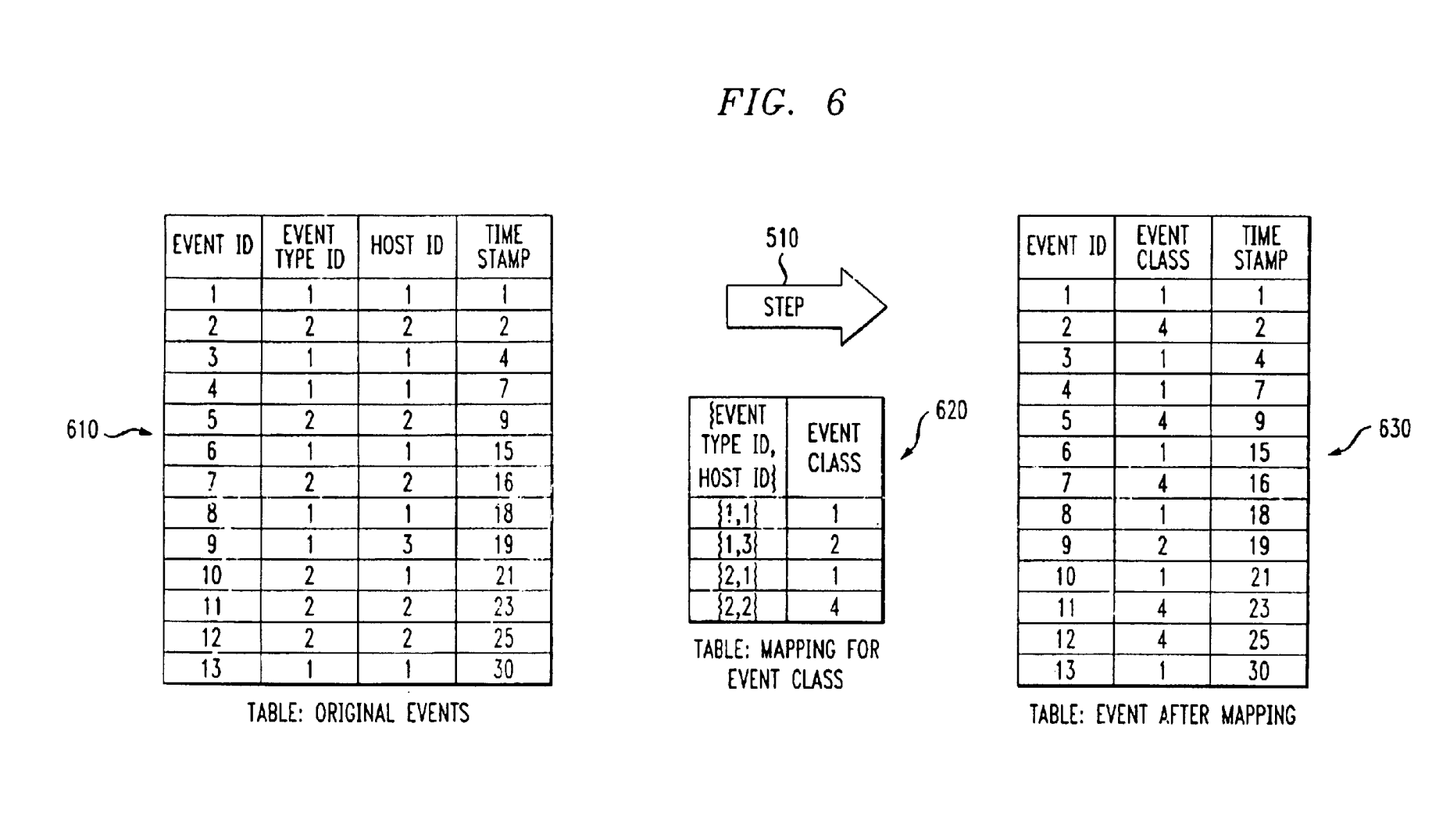
FIG. 6 describes a data transformation operation (step 510 of FIG. 5) of a working example.

FIG. 6 describes the data transformation operation (step 510 of FIG. 5) of our working example. The input of the working example is a table 610 with four attributes: event ID, event type ID, Host ID, and time stamp. The output is a normalized table 630 containing only three columns. Among them, event ID (column 1) and the time stamp (column 3) are directly copied from the input table. The event class ID (column 2) encodes the rest of the attributes of an event. In this example, the event class ID encodes or maps the pair of source name (host ID) and alarm type (event type ID) based on a lookup table 620 built by the algorithm. The lookup table 620 defines mapping rules. For example, the first entry of the lookup table maps events generated by host 1 with alarm type 1 into event class 1. Through this step, an application-independent table is obtained. A lookup-table type algorithm, as is well known in the art, can be used to perform this step.

Now, we describe an algorithm for mining m-patterns according to an embodiment of the present invention.

Figure 7:
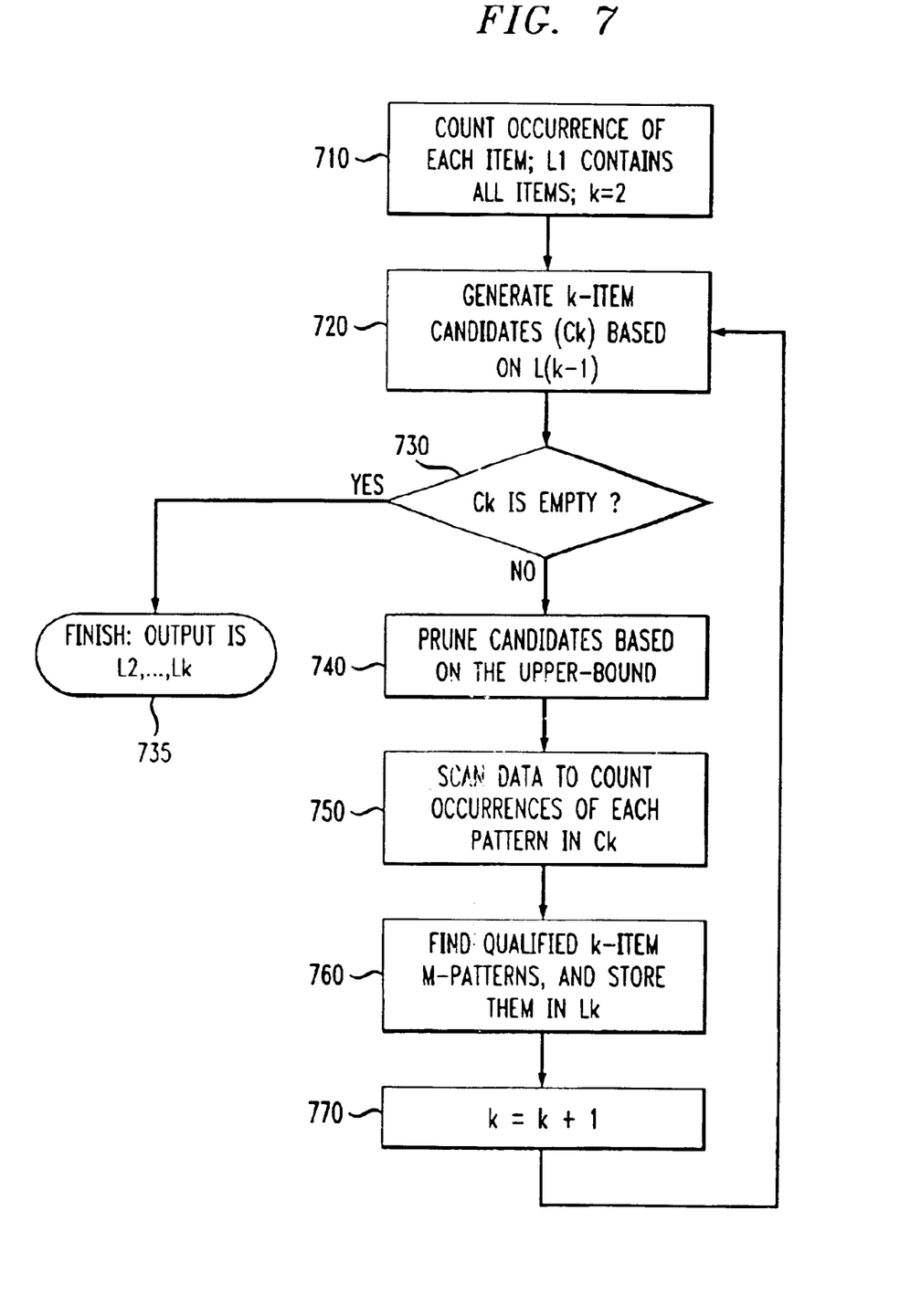
FIG. 7 is a flow diagram illustrating an m-pattern discovery methodology according to an embodiment of the present invention.

FIG. 7 is a flow diagram illustrating an m-pattern discovery methodology according to an embodiment of the present invention. Specifically, FIG. 7 illustrates the process of step 520 in FIG. 5. The inputs to the process are normalized event data D and minimum mutual dependence value minp. Minp is between 0 and 1. The process outputs a set of m-patterns.

Figure 8A:
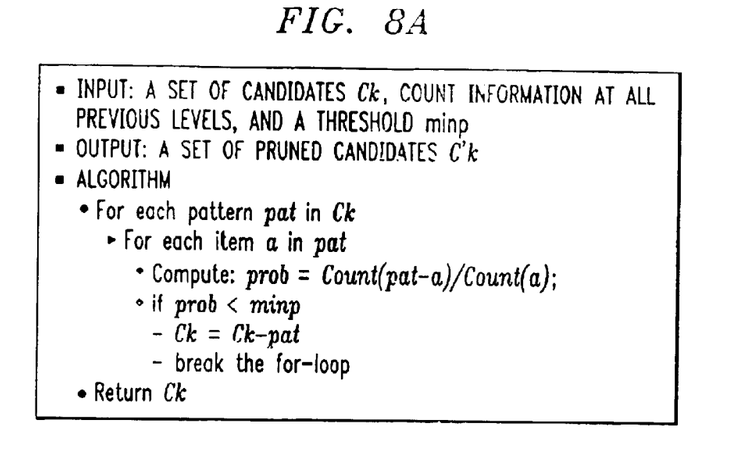
FIG. 8A is a diagram illustrating a pruning algorithm according to an embodiment of the present invention.

In particular, step 710 initializes the process. This includes: setting k=1; each distinct item is an m-pattern with length 1, and L1 contains all m-patterns with length 1. Then, still in step 710, k is set to 2. Ck represents a set of candidate m-patterns with length k. Lk represents all qualified patterns with length k. Step 720 generates new Ck based on L(k−1). Step 730 tests whether Ck is empty. If yes, the process terminates and outputs L, in step 735. Otherwise, step 740 prunes Ck based on the upper bound property described above. An example of a pruning algorithm according to the invention is shown in FIG. 8A. Step 750 scans data and counts the occurrences (instances) of patterns in Ck. Step 760 then tests whether a pattern in Ck is an m-pattern using a methodology, as described above and as illustrated in FIG. 8B. This step tests for mutual dependence as defined in accordance with the invention. Now, we have a set of qualified m-patterns with length k, which are stored in Lk. Lastly, step 770 increments k and the process is iterated for the next level. The process iterates through each level until all m-patterns are discovered.

FIG. 8A is a diagram illustrating a pruning algorithm according to an embodiment of the present invention. This algorithm may be employed in step 740 of FIG. 7. As described above, an m-pattern preferably has an upper bound property. In the algorithm shown in FIG. 8A, in order to further improve computational efficiency, we check a weaker upper bound than that described above. Specifically, following the upper bound property described above, the property here specifies that a pattern pat can not be an m-pattern, if p(pat-a\a)<minp, for any item a of pat. In other words, all candidate m-patterns should satisfy p(pat-a\a) for all its item a's. Checking this upper bound does not require the count of a pattern. This allows pruning of candidate patterns using information at the previous level. It is very effective, especially at a very low level.

Figure 8B:
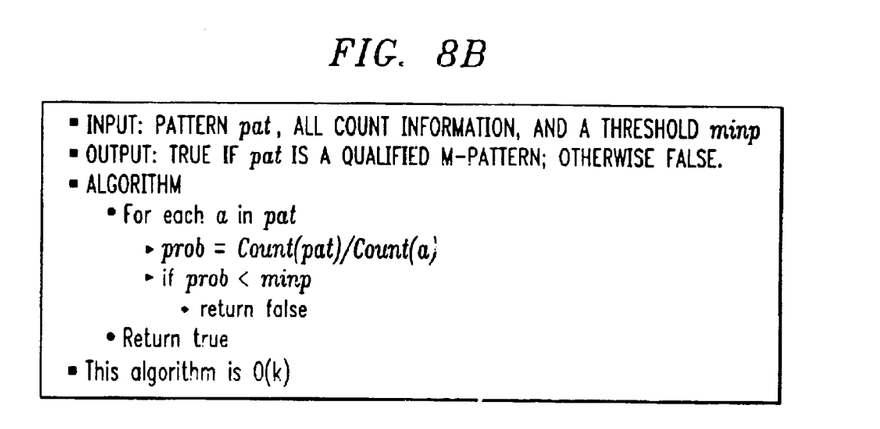
FIG. 8B is a diagram illustrating an algorithm for qualifying an m-pattern according to an embodiment of the present invention.

FIG. 8B is a diagram illustrating an algorithm for qualifying an m-pattern according to an embodiment of the present invention. Specifically, this algorithm utilizes the equivalent m-pattern definition described above. That is, for each item a of a pattern pat, the algorithm computes the conditional probability as p(pat-a\a)=count(pat)/count(a), and then compares the conditional probability with minp. It is to be understood that "pat" is not a qualified m-pattern, if the above test fails for any item a in pat.

Figure 9:
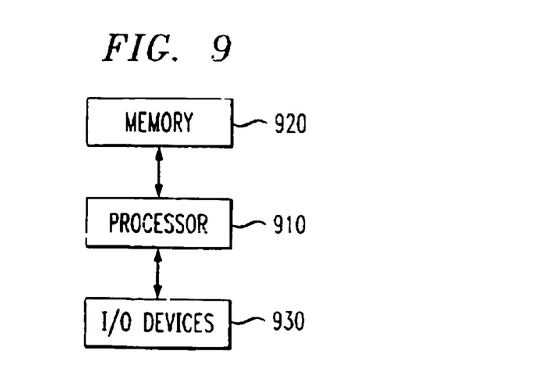
FIG. 9 is a block diagram illustrating a generalized hardware architecture of a computer system suitable for implementing a system for discovering m-patterns according to the present invention.

Referring now to FIG. 9, a block diagram is shown illustrating a generalized hardware architecture of a computer system suitable for implementing the various functional components/modules of a system for discovering m-patterns as depicted in the figures and explained in detail herein. It is to be understood that the individual components of the pattern mining system, e.g., as illustrated in FIG. 3, may be implemented on one such computer system, or on more than one separate such computer system. Also, individual components of the system may be implemented on separate such computer systems. It is to be appreciated that the user (e.g., 370 in FIG. 3) may interact directly with the one or more computer systems implementing the pattern mining system 300. Alternatively, the user may employ a computer system in communication (e.g., via a remote or local network) with the one or more computer systems implementing the system 300 in order to interact with the system 300.

As shown, the computer system may be implemented in accordance with a processor 910, a memory 920 and I/O devices 930. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices (e.g., keyboard, mouse, etc.) for entering data (e.g., user commands, constraints, parameters, etc.) to the processing unit, and/or one or more output devices (e.g., CRT display, printer, etc.) for presenting results (e.g., view lists, pattern visualizations, etc.) associated with the processing unit. For example, system user interfaces employed by the user may be realized through such I/O devices. It is also to be understood that the term "processor" may refer to more than one processing device and that various elements associated with a processing device may be shared by other processing devices.

Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Advantageously, as described above, a new form of pattern is provided in accordance with the invention, referred to as a mutual dependence pattern or m-pattern. The m-pattern captures mutual dependence among a set of items. Intuitively, the m-pattern represents a set of items that often occur together. Further, an efficient algorithm is provided for discovering all m-patterns in data for a given minimum mutual dependence threshold. Specifically, a linear algorithm is provided for testing whether a pattern is an m-pattern. Further, a pruning algorithm is provided that prunes the search space effectively. Still further, a level-wise algorithm for mining m-patterns is provided.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-based method of mining one or more patterns in an input data set of items, the method comprising the steps of:

identifying sets of items in the input data set as mutual dependence patterns based on respective comparisons of conditional probability values associated with each of the sets of items to a predetermined mutual dependence threshold value; and outputting the identified mutual dependence patterns based on results of the comparisons.

2. A computer-based method of mining one or more patterns in an input data set of items, the method comprising the steps of:

identifying one or more sets of items in the input data set as one or more patterns based on respective comparisons of conditional probability values associated with each of the one or more sets of items to a predetermined threshold value; and outputting the one or more identified patterns based on results of the comparisons;

wherein the identifying step further comprises identifying a set of items in the input data set, which includes at least two subsets of at least one item, as a pattern when the set of items has a conditional probability value computed therefor that is not less than a predetermined threshold value, wherein the conditional probability value is indicative of a probability that both of the at least two subsets of at least one item will occur given that one of the at least two subsets of at least one item has occurred.

3. The method of claim 2, wherein the predetermined threshold value is between zero and one.

4. The method of claim 2, wherein the conditional probability value is estimated by the number of occurrences in the input data set of the two subsets divided by the number of occurrences in the data set of one of the two subsets.

5. The method of claim 2, wherein the input data set comprises transaction data.

6. The method of claim 2, wherein the input data set comprises event data.

7. A computer-based method of mining one or more patterns in an input data set of items, the method comprising the steps of:

identifying one or more sets of items in the input data set as one or more patterns based on respective comparisons of conditional probability values associated with each of the one or more sets of items to a predetermined threshold value; and outputting the one or more identified patterns based on results of the comparisons;

wherein the identifying step further comprises identifying a set of items in the input data set as a pattern when the set of items has a conditional probability value computed for the set of items minus a particular item of the set, given the particular item of the set, that is not less than a predetermined threshold value.

8. The method of claim 7, wherein the predetermined threshold value is between zero and one.

9. A computer-based method of mining one or more patterns in an input data set of items, the method comprising the steps of:

obtaining an input data set of items;

searching the input data set of items to identify sets of items in the input data set as mutual dependence patterns based on respective comparisons of conditional probability values associated with each of the sets of items to a predetermined mutual dependence threshold value; and outputting the identified mutual dependence patterns based on results of the comparisons.

10. A computer-based method of mining one or more patterns in an input data set of items, the method comprising the steps of:

obtaining an input data set of items;

normalizing the input data set;

searching the input data set of items to identify one or more sets of items in the input data set as one or more patterns based on respective comparisons of conditional probability values associated with each of the one or more sets of items to a predetermined threshold value; and outputting the one or more identified patterns based on results of the comparisons, where in the input data set comprises event data and the normalizing step comprises transforming at least a portion of the event data into event classes such that the event data is non-application-dependent.

11. The method of claim 10, wherein the event data transformation step further comprises the step of mapping two or more attributes associated with an event into an event class.

12. The method of claim 11, wherein the mapping step is performed in accordance with a lookup table.

13. The method of claim 10, wherein the event data is in a tabular form with a first number of columns before the transformation step and in a tabular form with a second number of columns after the transformation step, the second number of columns being less than the first number of columns.

14. The method of claim 10, wherein the outputting step further comprises converting the one or more identified patterns into a human readable format.

15. A computer-based method of mining one or more patterns in an input data set of items, the method comprising the steps of:
   obtaining an input data set of items;
   searching the input data set of items to identify one or more sets of items in the input data set as one or more patterns based on respective comparisons of conditional probability values associated with each of the one or more sets of items to a predetermined threshold value; and
   outputting the one or more identified patterns based on results of the comparisons;
   wherein the searching step further comprises the step of performing a level-wise scan based on a set length to determine candidate sets of items in the input data set that have conditional probability values respectively computed therefor that are not less than the predetermined threshold value.

16. The method of claim 15, further comprising the step of pruning candidate sets based on an upper bound property.

17. The method of claim 16, wherein the upper bound property specifies that only candidate sets are considered where the conditional probability of a set of items minus a particular subset of items given the particular subset of items is not greater than the number of occurrences of the set of items minus the particular subset of items divided by the number of occurrences of the subset of items.

18. Apparatus for mining one or more patterns in an input data set of items, the apparatus comprising:
   at least one processor operative to: (i) identify sets of items in the input data set as mutual dependence patterns based on respective comparisons of conditional probability values associated with each of the sets of items to a predetermined mutual dependence threshold value; and (ii) output the identified mutual dependence patterns based on results of the comparisons; and
   a memory, coupled to the at least one processor, which stores at least one of the input data set and the identified mutual dependence patterns.

19. Apparatus for mining one or more patterns in an input data set of items, the apparatus comprising:
   at least one processor operative to: (i) identify one or more sets of items in the input data set as one or more patterns based on respective comparisons of conditional probability values associated with each of the one or more sets of items to a predetermined threshold value; and (ii) output the one or more identified patterns based on results of the comparisons; and
   a memory, coupled to the at least one processor, which stores at least one of the input data set and the one or more identified patterns;
   wherein the identifying operation further comprises identifying a set of items in the input data set, which includes at least two subsets of at least one item, as a pattern when the set of items has a conditional probability value computed therefor that is not less than a predetermined threshold value, wherein the conditional probability value is indicative of a probability that both of the at least two subsets of at least one item will occur given that one of the at least two subsets of at least one item has occurred.

20. The apparatus of claim 19, wherein the predetermined threshold value is between zero and one.

21. The apparatus of claim 19, the conditional probability value is estimated by the number of occurrences in the input data set of the two subsets divided by the number of occurrences in the data set of one of the two subsets.

22. The apparatus of claim 19, wherein the input data set comprises transaction data.

23. The apparatus of claim 19, wherein the input data set comprises event data.

24. Apparatus for mining one or more patterns in an input data set of items, the apparatus comprising:
   at least one processor operative to: (i) identify one or more sets of items in the input data set as one or more patterns based on respective comparisons of conditional probability values associated with each of the one or more sets of items to a predetermined threshold value; and (ii) output the one or more identified patterns based on results of the comparisons; and
   a memory, coupled to the at least one processor, which stores at least one of the input data set and the one or more identified patterns;
   wherein the identifying operation further comprises identifying a set of items in the input data set as a pattern when the set of items has a conditional probability value computed for the set of items minus a particular item of the set, given the particular item of the set, that is not less than a predetermined threshold value.

25. The apparatus of claim 24, wherein the predetermined threshold value is between zero and one.

26. Apparatus for mining one or more patterns in an input data set of items, the apparatus comprising:
   at least one processor operative to: (i) obtain an input data set of items; (ii) search the input data set of items to identify sets of items in the input data set as mutual dependence patterns based on respective comparisons of conditional probability values associated with each of the sets of items to a predetermined mutual dependence threshold value; and (iii) output the identified mutual dependence patterns based on results of the comparisons; and
   a memory, coupled to the at least one processor, which stores at least one of the input data set and the identified mutual dependence patterns.

27. Apparatus for mining one or more patterns in an input data set of items, the apparatus comprising:
   at least one processor operative to: (i) obtain an input data set of items; (iii) search the input data set of items to identify one or more sets of items in the input data set as one or more patterns based on respective comparisons of conditional probability values associated with each of the one or more sets of items to a predetermined threshold value; and (iii) output the one or more identified patterns based on results of the comparisons; and
   a memory, coupled to the at least one processor, which stores at least one of the input data set and the one or more identified patterns;

wherein the at least one processor is further operative to, prior to the searching operation, normalize the input data set, and further wherein the input data set comprises event data and the normalizing operation comprises transforming at least a portion of the event data into event classes such that the event data is non-application-dependent.

28. The apparatus of claim 27, wherein the event data transformation operation further comprises mapping two or more attributes associated with an event into an event class.

29. The apparatus of claim 28, wherein the mapping operation is performed in accordance with a lookup table.

30. The apparatus of claim 27, wherein the event data is in a tabular form with a first number of columns before the transformation operation and in a tabular form with a second number of columns after the transformation operation, the second number of columns being less than the first number of columns.

31. The apparatus of claim 27, wherein the outputting operation further comprises converting the one or more identified patterns into a human readable format.

32. Apparatus for mining one or more patterns in an input data set of items, the apparatus comprising:
at least one processor operative to: (i) obtain an input data set of items; (ii) search the input data set of items to identify one or more sets of items in the input data set as one or more patterns based on respective comparisons of conditional probability values associated with each of the one or more sets of items to a predetermined threshold value; and (iii) output the one or more identified patterns based on results of the comparisons; and
a memory, coupled to the at least one processor, which stores at least one of the input data set and the one or more identified patterns;
wherein the searching operation further comprises performing a level-wise scan based on a set length to determine candidate sets of items in the input data set that have conditional probability values respectively computed therefor that are not less than the predetermined threshold value.

33. The apparatus of claim 32, wherein the at least one processor is further operative to prune candidate sets based on an upper bound property.

34. The apparatus of claim 33, wherein the upper bound property specifies that only candidate sets are considered where the conditional probability of a set of items minus a particular subset of items given the particular subset of items is not greater than the number of occurrences of the set of items minus the particular subset of items divided by the number of occurrences of the subset of items.

35. An article of manufacture for mining one or more patterns in an input data set of items, the article comprising a machine readable medium containing one or more programs which when executed implement the steps of:
identifying sets of items in the input data set as mutual dependence patterns based on respective comparisons of conditional probability values associated with each of the sets of items to a predetermined mutual dependence threshold value; and
outputting the identified mutual dependence patterns based on results of the comparisons.

36. An article of manufacture for mining one or more patterns in an input data set of items, the article comprising a machine readable medium containing one or more programs which when executed implement the steps of:
obtaining an input data set of items;
searching the input data set of items to identify sets of items in the input data set as mutual dependence patterns based on respective comparisons of conditional probability values associated with each of the sets of items to a predetermined mutual dependence threshold value; and
outputting the identified mutual dependence patterns based on results of the comparisons.

* * * * *

UNITED STATES PATENT AND TRADEMARK OFFICE
CERTIFICATE OF CORRECTION

PATENT NO. : 6,829,608 B2
DATED : December 7, 2004
INVENTOR(S) : S. Ma et al.

It is certified that error appears in the above-identified patent and that said Letters Patent is hereby corrected as shown below:

Column 14,
Line 13, after "," insert -- wherein --
Line 57, delete "(iii)" and insert -- (ii) --

Signed and Sealed this

Twenty-second Day of February, 2005

JON W. DUDAS
*Director of the United States Patent and Trademark Office*